United States Patent
Perlman et al.

(10) Patent No.: US 6,195,086 B1
(45) Date of Patent: *Feb. 27, 2001

(54) METHOD AND APPARATUS FOR LOOSELY SYNCHRONIZING CLOSED FREE RUNNING RASTER DISPLAYS

(75) Inventors: Stephen G. Perlman, Mountain View; Steven G. Roskowski, San Jose, both of CA (US)

(73) Assignee: HearMe, Mt. View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/996,786

(22) Filed: Dec. 23, 1997

Related U.S. Application Data (63) Continuation of application No. 08/713,593, filed on Sep. 12, 1996, now Pat. No. 5,790,113.

(51) Int. Cl.$^7$ ............................ G09G 5/00; F16D 7/02
(52) U.S. Cl. ........................ 345/213; 345/1; 463/42
(58) Field of Search ....................... 345/1, 2, 3, 212, 345/213, 302; 348/4, 500, 513, 514, 516, 517, 521, 526; 463/40, 41, 42; 395/551, 553; 327/141

(56) References Cited

U.S. PATENT DOCUMENTS

| | | | | |
|---|---|---|---|---|
| 4,012,592 | * | 3/1977 | Ricard | 345/213 |
| 4,156,254 | * | 5/1979 | Marino | 345/212 |
| 4,572,509 | * | 2/1986 | Sitrick | 463/42 |
| 4,611,228 | * | 9/1986 | Machida et al. | 345/213 |
| 4,994,912 | * | 2/1991 | Lumelsky et al. | 345/213 |
| 5,083,800 | * | 1/1992 | Lockton | 463/42 |
| 5,292,125 | * | 3/1994 | Hochstein et al. | 463/42 |
| 5,350,176 | * | 9/1994 | Hochstein et al. | 463/42 |
| 5,351,088 | * | 9/1994 | Nio et al. | 348/441 |
| 5,465,206 | | 11/1995 | Hilt et al. | 364/406 |
| 5,469,183 | * | 11/1995 | Takatsuji et al. | 345/1 |
| 5,483,445 | | 1/1996 | Pickering | 364/406 |
| 5,538,255 | * | 7/1996 | Barker | 463/41 |
| 5,610,622 | * | 3/1997 | Takeda et al. | 345/213 |
| 5,668,594 | * | 9/1997 | Cahill, III | 345/213 |

* cited by examiner

*Primary Examiner*—Jeffery Brier
*Assistant Examiner*—Paul A. Bell
(74) *Attorney, Agent, or Firm*—Wilson Sonsini Goodrich & Rosati (57) ABSTRACT

The present invention is a means and method for synchronizing closed free-running systems, such as graphics systems, with no external synchronization signals required. Video games and most computer display controllers are closed free-running systems. Because most such systems have the means to switch between an interlaced and non-interlaced operation, and because interlaced and non-interlaced modes have a relative timing variation, the timing between two or more such closed free-running systems can be synchronized. This method allows synchronization with an imprecise timing reference. The vertical display timing is the free-running oscillator and the interlaced/non-interlaced mode transition is used as the timing adjustment means. The actual arrival time of data in a communication medium connecting two systems being synchronized is used in relation to an expected arrival time to provide the clock reference.

3 Claims, 8 Drawing Sheets

METHOD AND APPARATUS FOR LOOSELY SYNCHRONIZING CLOSED FREE RUNNING RASTER DISPLAYS

REFERENCE TO RELATED PATENT APPLICATIONS

This application is a continuation of application Ser. No. 08/713,593, entitled "Method And Apparatus For Loosely Synchronizing Closed Free Running Reaster Displays," filed on Sep. 12, 1996, now U.S. Pat. No. 5,790,113.

The following co-pending patent applications are related:

U.S. patent application entitled, "AN IMPROVED NETWORK ARCHITECTURE TO SUPPORT REAL-TIME VIDEO GAMES", invented by Steve Perlman, with Ser. No. 08/238,630 and filed on May 5, 1994.

U.S. patent application entitled, "AN IMPROVED NETWORK ARCHITECTURE TO SUPPORT MULTIPLE SITE REAL-TIME VIDEO GAMES", invented by Steve Perlman, with Ser. No. 08/238,477 and filed on May 5, 1994.

U.S. patent application entitled, "AN IMPROVED MODEM TO SUPPORT MULIPLE SITE CALL CONFERENCED DATA COMMUNICATIONS", invented by Steve Perlman, with Ser. No. 08/238,456 and filed on May 5, 1994.

U.S. patent application entitled, "AN IMPROVED NETWORK ARCHITECTURE TO SUPPORT RECORDING AND PLAYBACK OF REAL-TIME VIDEO GAMES", invented by Steve Perlman, with Ser. No. 08/238,303 and filed on May 5, 1994.

FIELD OF THE INVENTION

The present invention relates to the field of raster scan display controllers. Specifically, the present invention pertains to synchronization of multiple raster scan display controllers.

DESCRIPTION OF RELATED ART

Images are drawn on prior art raster display systems, such as television and computer displays, by tracing a plurality of horizontal raster scan lines, each scan line comprising a row of individual pixels. The entire image is scanned out sequentially by a video controller one scan line at a time from the top left corner of the display screen to the bottom right corner of the display screen. Clocking circuitry, typically included with the video controller, is used to maintain precise control over the rate at which scan lines are traced. Typically, a crystal oscillator is used as a clock source for this clocking circuitry. Although oscillators and other clock sources usually provide a highly accurate clock source for a particular display system, small variations in the timing between different oscillators invariably occur. These variations can be aggravated by environmental conditions such as temperature. Thus, it can be expected that two identical, but independent, display systems initially started at the same instant will eventually drift out of synchronization to the point where one of the display systems will eventually get a full frame ahead of the other. These prior art systems do not provide a means for synchronizing the raster scan process among a plurality of independent raster display systems without driving each system with a precise common clock source.

Prior art raster display systems operate in two fundamental types of refresh modes: interlaced and non-interlaced mode. Interlaced mode is used in broadcast television (NTSC, PAL, and SECAM) and in raster displays designed to drive standard television monitors. NTSC (National Television System Committee), PAL (Phase Alternate Line), and SECAM are well known raster display design and operational standards. For NTSC, the refresh cycle in interlaced mode is broken into phases (known as "fields"), each phase lasting $\frac{1}{60}$ of a second ($\frac{1}{50}$ of a second for PAL and SECAM); thus, a full NTSC refresh cycle lasts $\frac{1}{30}$ of a second ($\frac{1}{25}$ of a second for PAL/SECAM). All odd numbered scan lines are displayed in the first phase and all even numbered scan lines are displayed in the second phase. The purpose of the interlaced scan mode is to place some new information in all areas of the screen at a 60 Hz rate; because, a 30 Hz refresh rate tends to cause an irritating flicker. The net effect of interlacing is to produce a picture whose effective refresh rate is perceptively like 60 Hz while actually running at 30 Hz. This technique works as long as adjacent scan lines display similar information. An image consisting of dissimilar horizontal lines on alternating scan lines, such as often occurs in computer-generated images, causes an unpleasant line flicker effect.

When an NTSC display is refreshed in a non-interlaced mode (as is common with home computers and video games), the refresh cycle consists of scanning just the first phase or just the odd numbered scan lines at a 60 Hz rate. Alternatively, just the even numbered scan lines are refreshed at a 60 Hz rate. The unrefreshed scan lines in a non-interlaced mode are displayed as black or absent any image features. The non-interlaced mode is commonly used in home computers and video game displays because line flicker problems cannot be tolerated.

Most video game displays run independently from any external clock source. Thus, using prior art synchronization techniques, multiple video game displays can not be synchronized to each other. Even advanced video games and computer systems that can accept an external clock source for synchronization require such clock to be extremely precise; accurate to the order of one part per 10 million. In many situations, such a precise clock cannot be feasibly provided (e.g. if only a telephone modem connection exists between the systems).

Thus, a better means and method for synchronizing closed free-running systems is needed.

SUMMARY OF THE INVENTION

The present invention is a means and method for synchronizing closed free-running systems, such as graphics systems, with no external synchronization signals required. Video games and most computer display controllers are closed free-running systems. Because most such systems have the means to switch between an interlaced and non-interlaced operation, and because interlaced and non-interlaced modes have a relative timing variation, the timing between two or more such closed free-running systems can be synchronized. This method allows synchronization with an imprecise timing reference. The present invention is specifically applicable to maintaining frame synchronization between two video games or computer systems connected via a modem link.

The present invention is similar to a phase-locked loop. The vertical display timing is the free-running oscillator and the interlaced/non-interlaced mode transition is used as the timing adjustment means. The actual arrival time of data in a communication medium connecting two systems being synchronized is used in relation to an expected arrival time to provide the clock reference.

Television studios have distributed synchronized signals that are accurate on the order of 1 part per 100 million (i.e.

10 us clock precision). The present invention operates with timing references as slow as 300 Hz with an accuracy no better than 1 part per 525 (about 2 msec clock accuracy). Also, the present invention can achieve synchronization by use of a timing reference which is asynchronous to both raster timings (e.g. 2400 bps modem bit clock). It is a further advantage of the present invention that the implementation of the synchronization apparatus of the present invention requires a minor amount of processing to maintain synchronization, and no external hardware needs to be added to the display controller. It is a further advantage of the present invention that the implementation of the synchronization apparatus of the present invention does not noticeably disturb the displayed image while maintaining synchronization. The brief transitions between alternate timing modes cannot typically be perceived by a human viewer. Television and other raster devices are not disrupted by the brief transitions between alternate timing modes. It is a further advantage of the present invention that the implementation of the synchronization apparatus of the present invention works with either normally interlaced or normally non-interlaced displays. Normally non-interlaced displays are switched to interlaced mode briefly to maintain synchronization. Normally interlaced displays are switched to non-interlaced mode briefly to maintain synchronization. Because both display generators are crystal-controlled, the display generators will be fairly stable relative to each other and will only need brief, periodic adjustments. Typically, several hundred normal frames are displayed before a single frame of the alternate mode is switched in. It is a further advantage of the present invention that the implementation of the synchronization apparatus of the present invention is tolerant to the loss of a timing reference for short intervals. Often in video games, for example, the vertical blanking interrupt is turned off for brief periods of time. This occurs, for example, while a new screen is being set up during a transition. Although the timing of the two display controllers may drift during this time, their crystal references guarantee they won't drift very far. Thus, several seconds can safely elapse before vertical blanking interrupts are restored. When vertical blanking interrupts are restored, the present invention pulls the two displays exactly into synchronization again. Typically, only two or three alternate frames (as opposed to the usual one frame) are needed to restore synchronization within-tolerance. Finally, it is a further advantage of the present invention that the two or more systems being synchronized are not allowed to drift more than one full frame apart. Drift by several scan lines is allowed. The present invention maintains synchronization of two or more systems within the larger of: 1) the time required to scan one line or 2) the accuracy of the communications medium's clock. It is a further advantage of the present invention that because the display subsystems of most personal computers (e.g. current-generation IBM™ PC compatibles and Apple™ Macintosh™) and video game systems (e.g. Sega™ and Super Nintendo Entertainment System™—SNES) are capable of switching seamlessly between interlace and non-interlaced modes of operation, the present invention has practical application to tens of millions of existing systems. These and other objects and advantages of the present invention will be apparent as presented in the following detailed description of the preferred embodiment.

DETAILED DESCRIPTION OF THE PREFERRED EMBODIMENT

The present invention is a means and method for synchronizing closed free-running systems, such as graphics systems, with no external synchronization signals required. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
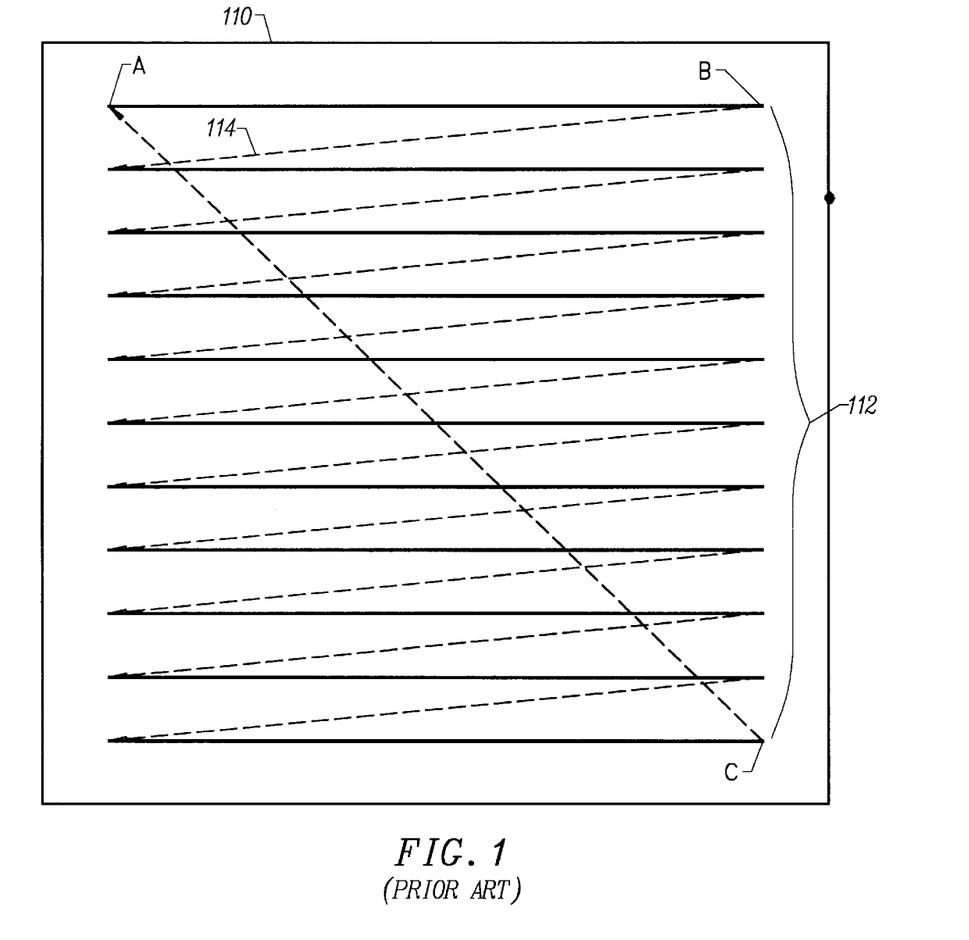
FIGS. 1, 2, 3A, and 3B are simplified illustrations of prior art raster scan techniques including use of an interlaced mode and a non-interlaced mode.

Referring now to FIG. 1, a raster type display screen 110 is illustrated in simplified form. Raster display screen 110 includes a plurality of scan lines 112. Each scan line comprises a plurality of pixels (not shown). Using a conventional raster scan process, a full screen scan begins at the upper left corner of screen 110 at point A. Scanning begins at point A for the first scan line and continues to point B. The raster is then set to the beginning of the second scan line as indicated by dashed line 114 illustrated in FIG. 1. The second scan line is then scanned horizontally from left to right in the same manner. The same process is used to scan each scan line of the display until the last scan line is scanned. At that point, the raster will be positioned at point C and a vertical blanking signal will be generated. The raster will then be reset to point A and the full screen scanning process will be initiated again for the next refresh cycle. The time required to reset the raster to point A from point C is typically known as the vertical blanking interval (VBI). The time required for the raster to scan from point A to point C is a predetermined fixed length time as determined by the scan rate of a particular display system. The full resolution non-interlaced raster scan process-illustrated in FIG. 1 and described above is well known to those of ordinary skill in the art. Such a method is commonly used for high resolution computer displays.

Figure 2:
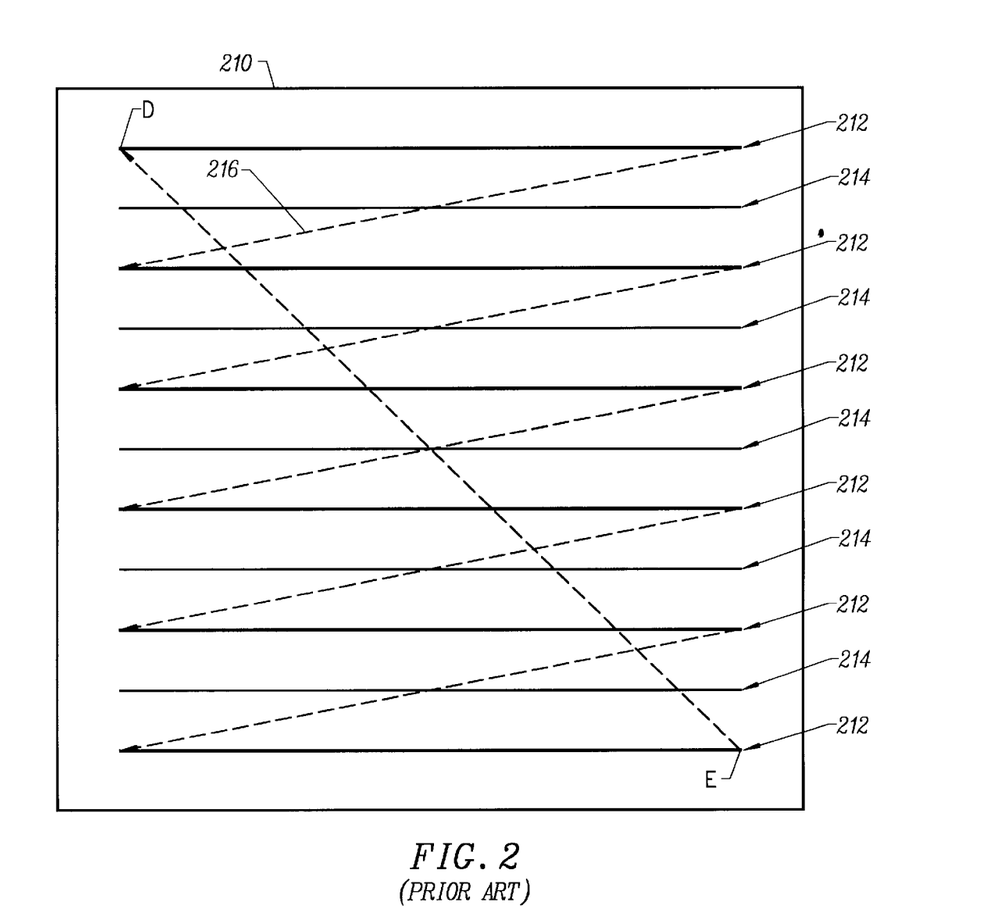

Referring now to FIG. 2, a prior art implementation of a half-resolution non-interlaced mode is illustrated in simplified form. A display screen 210 supporting a full-resolution interlaced and a half resolution non-interlaced mode comprises two sets of scan lines (two fields in interlaced mode). A first set of scan lines 212, illustrated in FIG. 2, is scanned when display 210 is operating in a half-resolution non-interlaced mode. A second set of scan lines 214 is not scanned during operation in a half-resolution non-interlaced mode. In half-resolution non-interlaced mode operation, the raster begins at point D and fully scans the first scan line of the first set of scan lines 212. When the first scan line has been completely scanned, the raster is reset to the beginning of the second scan line of the first set of scan lines 212 as indicated by dashed line 216 illustrated in FIG. 2. Thus, the raster skips over the first scan line of the second set of scan lines 214 and each of the remaining scan lines of the second set of scan lines 214. In this manner, the raster refreshes alternate scan lines from point D to point E. Upon completion of scanning to point E, a vertical blanking signal is generated and the raster returns for the next refresh cycle to point D. It will be apparent to one of ordinary skill in the art that the scan time required to refresh scan lines in a half-resolution non-interlaced mode from point D to point E is half the time required to scan all of the scan lines on display 210. This is because only half of the available scan lines are scanned in a half-resolution non-interlaced mode. In this manner, an image displayed on display 210 can be updated twice as fast as compared to a full-resolution non-interlaced display, such as the display 110 illustrated in FIG. 1 where all of the scan lines are refreshed for each cycle (assuming both have an equal number of scan lines and the same horizontal scan rate). The use of a half-resolution non-interlaced mode for refreshing half of the scan lines of a raster display screen is well known to those of ordinary skill in the art. A half-resolution non-interlaced mode is commonly used by home video game systems to provide a flicker-free television image.

Figure 3A:
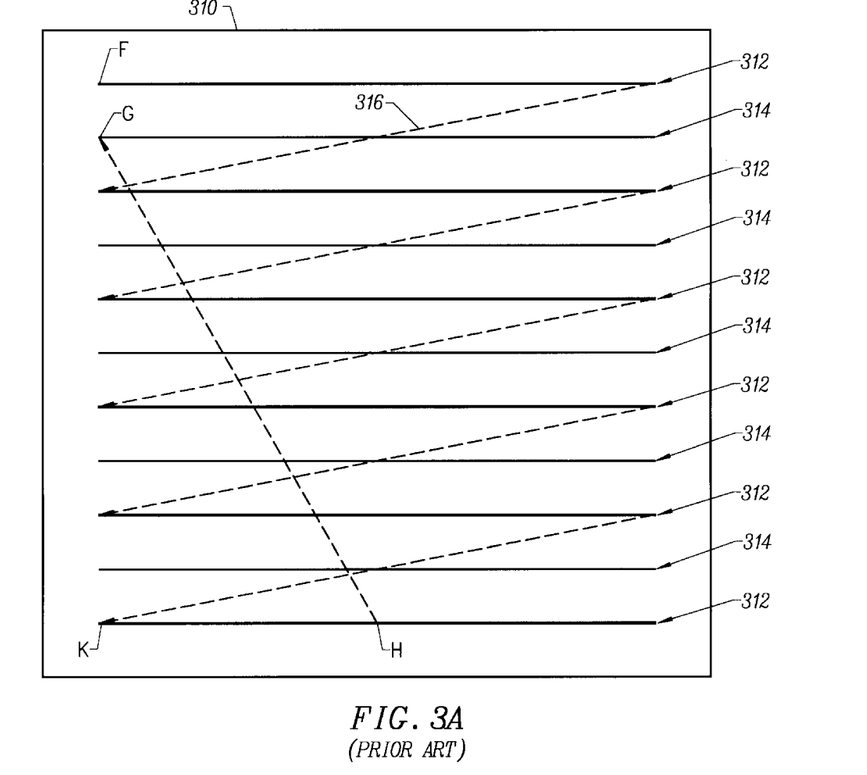
Figure 3B:
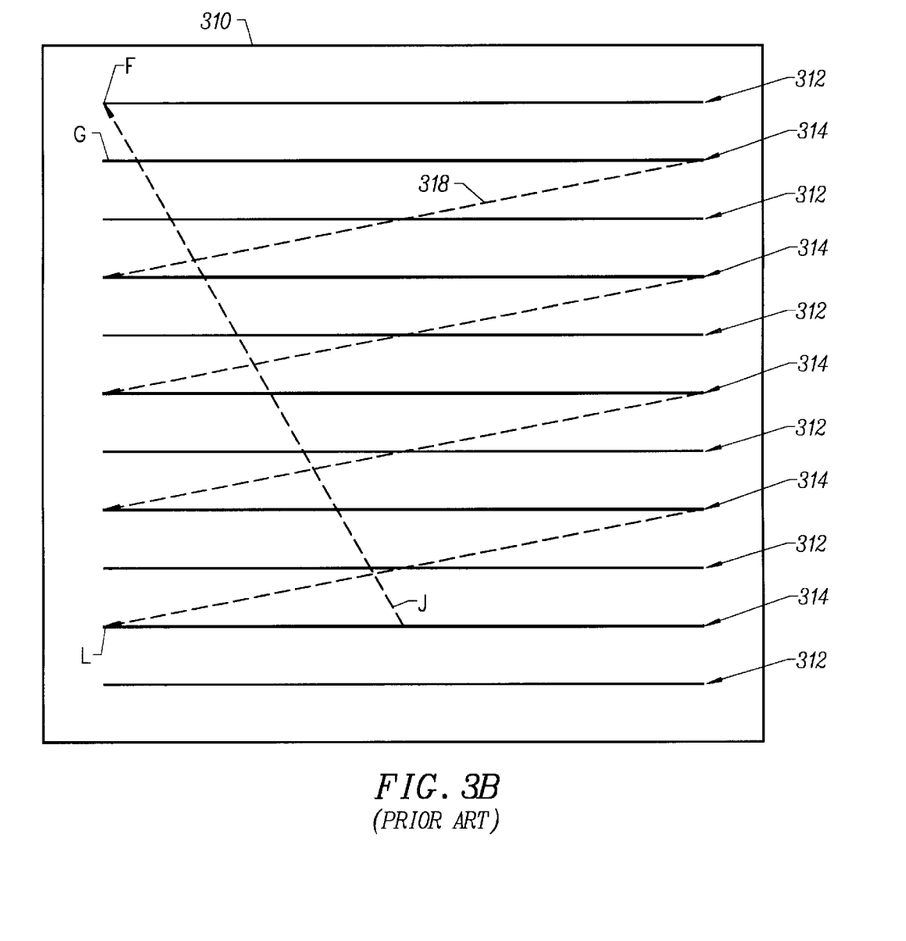

Referring now to FIGS. 3A and 3B, operation in a full-resolution interlaced mode are illustrated in simplified form (note that in actuality interlaced scanning is somewhat more complex, but the timing shown here reflects the issues relevant to the present invention. Detailed diagrams of interlaced scanning can be found in standard television engineering texts or the EIA RS-170A Standards Proposal.) In full-resolution interlaced mode, a first set of scan lines (first field) 312 are refreshed during a first refresh cycle and a second set of scan lines (second field) 314 are refreshed in a second refresh cycle. FIG. 3A illustrates the first refresh cycle and FIG. 3B illustrates the second refresh cycle. Referring to FIG. 3A, the interlaced mode refresh cycle begins at point F at the beginning of the first scan line in the first field 312. When the raster has completely refreshed the first scan line in the first field 312, the raster is moved to the second scan line in the first field 312 as indicated by dashed line 316 illustrated in FIG. 3A. In this manner, each scan line in the first field 312 is refreshed until the raster reaches point H. Point H, as illustrated in FIG. 3A, is located at the mid-point of the last scan line of the first field 312. By scanning only half of the last scan line of the first field 312, the raster is able to move to point G at the initial position on the first scan line of the second field 314. In this manner, the raster is set up to refresh the second field 314 beginning at point G as illustrated in FIG. 3B.

Referring now to FIG. 3B, the second refresh cycle begins for the second field 314 at point G. When the first scan line of the second field 314 is refreshed, the raster moves to the beginning of the second scan line of the second field 314 as indicated by dashed line 318 illustrated in FIG. 3B. In this manner, each of the scan lines of the second field 314 are refreshed down to the last scan line of the second field 314. Only half of the last scan line of the second field 314 is refreshed as indicated by point J. When the raster has reached point J, a vertical blanking signal is generated and the raster returns to the initial position of the first scan line of the first field 312 as indicated by point F where the next refresh cycle begins again. Using this process, alternate scan lines of display 310 are refreshed in alternate refresh cycles in an interlaced mode.

Comparing now FIGS. 2 and 3A/B, it can be seen that for a similar horizontal and vertical scan rate, one frame of FIG. 2 takes approximately, but-not exactly, the same amount of time to scan as one field of FIG. 3A or 3B. Operation of a raster display device in an interlaced mode is well known to those of ordinary skill in the art. Interlaced mode is commonly used by television studio video effects devices and home video game systems when displaying high-resolution images. An example of interlaced scanning is Sega's "Sonic the Hedgehog 3" in 2-player mode. Noticeable flicker is apparent.

Although the use of interlaced mode is well known in the art, a subtle timing variation caused by the transition between an interlaced mode and non-interlaced mode and the application of this timing variation for synchronizing two raster display devices is not well known to those of ordinary skill in the art. Because the conventional implementation of interlaced mode only refreshes half of the last scan line in a field, the overall time required for an entire refresh cycle in an interlaced mode is offset by the amount of time required to refresh half of one scan line of each field. This offset in the refresh cycle time is denoted herein as $\Delta t$.

Referring again to FIGS. 3A and 3B, the time required to scan from point K to point H in FIG. 3A and point L to point J in FIG. 3B is $\Delta t$. Thus, if R represents the refresh cycle time required for refreshing a display frame in a non-interlaced mode, the refresh cycle time required for refreshing a single display field.(two fields per frame) in interlaced mode is therefore $R-\Delta t$. The refresh cycle time required for refreshing a single display frame (two fields per frame) in interlaced mode is therefore $2(R-\Delta t)$. In other words, because $\Delta t$ is one half of the time required to raster scan a single scan line, the timing variation between two non-interlaced mode frames and a single interlaced mode frame is equal to the time required to raster scan a single scan line (i.e., 2*0.5 scan lines). The actual duration of R and $\Delta t$ varies for particular display systems depending on the number of scan lines available, the number of pixels per scan line, and the scan rate. Note, however that $\Delta t$ is relatively small in comparison to the refresh cycle time R required for refreshing a non-interlaced frame or interlaced field.

The timing variation caused by the transition between an interlaced mode and non-interlaced mode is different for various specific implementations of a raster device. Further, conventional systems support several variants of the interlaced and non-interlaced modes. For example, NTSC specifies 262.5 scan lines per 60 Hz field in an interlaced mode of operation. Some video games, personal computers, and other devices alter NTSC standard operation and display either 262 scan lines or 263 scan lines per 60 Hz frame (not field) in a non-interlaced mode of operation. "Field" is a term applicable only to interlaced mode. In a half-resolution non-interlaced mode, only half of the scan lines are displayed for each frame, as illustrated in FIG. 2. Thus, gaps between the displayed scan lines will be apparent in this mode. However, most video game systems (e.g. Sega Genesis or Super Nintendo Entertainment System) have the means to display the same image data in both fields in interlaced mode. This mode is sometimes referred to as field-doubled interlaced mode. This mode has the visual effect of just filling in the gaps between displayed scan lines and adding a small element of jitter or flicker to the image. Many prior art display systems also have a field-unique interlaced mode used to display different image data in each of the two fields in interlaced mode. This mode produces a high resolution image. Thus, there are often three display modes supported in prior art raster display controllers. These raster devices are included in video game displays and in most personal computer displays. These three display modes are set forth below. NTSC modes are described, analogous modes for PAL/SECAM are available as well in prior art systems.

(i) Non-interlaced.—262 or 263 lines/60 Hz frame are provided. Gaps are displayed between lines. Note that there are 262 or 263 lines (less vertical blanking lines) scanned from the frame buffer.

(ii) Field-doubled interlaced—262.5 lines/60 Hz field are provided. The same field data is displayed in each field. Visually, this mode is the same as mode (i) above, except the gaps between lines are filled in and there is a slightly noticeable jitter. Note there are just 262.5 lines (less vertical blanking lines) scanned from the frame buffer.

(iii) Field-unique interlace—262.5 lines/60 Hz field are provided. Unique field data is displayed in each field. There are 525 scan lines (less vertical blanking lines) scanned from the frame buffer.

By way of example and not limitation, these three display modes produce some timing variations relative to each other as will be illustrated by example below. Over a course of 1/30 second:

mode (i) scans out 262*2=524 or 263*2=526 scan lines.

mode (ii) scans out 262.5*2=525 lines.

mode (iii) scans out 262.5*2=525 lines.

Because the line time (i.e. the time required to raster scan a single scan line) is fixed at 63.556 usec in a typical prior art NTSC display device, the timing difference between mode (i) and mode (ii) or mode (i) and mode (iii) is 63,556 usec (i.e. one line time) per 1/30 second. Another way of looking at it is, by switching between mode (i) and mode (ii) or between mode (i) and mode (iii), the vertical blanking interval of the display device can be slewed in time relative to that of another display device by 30 scan lines/second. This method of slewing the timing between display devices can be used, as in the present invention, for synchronizing the operation of two or more raster display devices. In the preferred embodiment, the timing adjustment apparatus can slew the timing between two or more systems by as much as 30 scan lines per second for NTSC systems and 25 scan lines/sec for PAL systems. Note that although non-interlace mode and interlace mode may vary in the exact number of scan lines from implementation-to-implementation, there must always be a timing difference between a half-resolution non-interlace mode and full-resolution interlace mode (be it field-double or field-unique) because of the requirement to have the last scan line be half of a line long in order to achieve interlacing.

Clearly, if the normal operation mode for a particular display device is mode (i) (as is true for most video games), a timing adjustment apparatus can maintain synchronization between two devices by occasionally switching one device to mode (ii) to maintain synchronization. Because mode (i) and mode (ii) are visually almost identical, the switch between mode (i) and mode (ii) is virtually undetectable to the human eye. Certainly, switching from mode (i) to mode (ii) once per several seconds is virtually undetectable by the human eye.

If the normal operation mode for a particular display device is mode (ii), the timing adjustment apparatus can also maintain synchronization between two devices by occasionally switching one device to mode (i) to maintain synchronization.

If the normal operation mode for a particular display device is mode (iii), the timing adjustment apparatus can also maintain synchronization between two devices by occasionally switching one device to mode (i) to maintain synchronization. However, part of the image resolution is sacrificed by switching to mode (i) from mode (iii). Nonetheless, because the loss of resolution is no more than one field per several seconds, this loss is also virtually undetectable to the eye. The present invention includes such a timing adjustment apparatus for maintaining synchronization between two raster display devices by switching among various available display modes.

Note that televisions and display monitors (and even LCD's) are designed to handle both interlaced and non-interlaced modes. These devices readily handle the slight variations in timing with no adverse effects.

Note also that non-interlaced mode is "non-standard" NTSC, and as such, system designers may choose either 262 or 263 as the number of displayed scan lines. Televisions work fine with either number of scan lines. The only impact this selection has on the present invention is that the timing adjustment apparatus switches to the "alternate" display mode in one or the other display device depending on the number of scan lines selected and depending on which display device is getting ahead or falling behind. The following description describes the various cases.

Case 1: In a first and a second display system, if the normal display mode is non-interlaced with 263 scan lines/frame and the alternate display mode is interlaced with 262.5 scan lines/field (i.e. the normal mode non-interlaced scan time is longer than the alternate mode interlaced scan time), the first display system is synchronized with the second display system as follows:

a. If the first display system falls behind the second display system (i.e. the VBI of the first display system occurs later than that of the second display system), the first display system is switched to the alternate display mode (i.e. the shorter scan time mode) and the second display system is maintained in the normal display mode.

b. If the first display system gets ahead of the second display system (i.e. the VBI of the first display system occurs sooner than that of the second display system), the first display system is maintained in the normal display mode and the second display system is switched to the alternate display mode (i.e. the shorter scan time mode).

Case 2: In a first and a second display system, if the normal display mode is interlaced with 262.5 scan lines/field and the alternate display mode is non-interlaced with 263 scan lines/frame (i.e. the normal mode interlaced scan time is shorter than the alternate mode non-interlaced scan time), the first display system is synchronized with the second display system as follows:

a. If the first display system falls behind the second display system (i.e. the VBI of the first display system occurs later than that of the second display system), the first display system is maintained in the normal display mode and the second display system is switched to the alternate display mode (i.e. the longer scan time mode).

b. If the first display system gets ahead of the second display system (i.e. the VBI of the first display system occurs sooner than that of the second display system), the first display system is switched to the alternate display mode (i.e. the longer scan time mode) and the second display system is maintained in the normal display mode.

Case 3: In a first and a second display system, if the normal display mode is non-interlaced with 262 scan lines/frame and the alternate display mode is interlaced with 262.5 scan lines/field (i.e. the normal mode non-interlaced scan time is shorter than the alternate mode interlaced scan time), the first display system is synchronized with the second display system as follows:

a. If the first display system falls behind the second display system (i.e. the VBI of the first display system occurs later than that of the second display system), the first display system is maintained in the normal display mode and the second display system is switched to the alternate display mode (i.e. the longer scan time mode).

b. If the first display system gets ahead of the second display system (i.e. the VBI of the first display system occurs sooner than that of the second display system), the first display system is switched to the alternate display mode (i.e. the longer scan time mode) and the second display system is maintained in the normal display mode.

Case 4: In a first and a second display system, if the normal display mode is interlaced with 262.5 scan lines/field and the alternate display mode is non-interlaced with 262 scan lines/frame (i.e. the normal mode interlaced scan time is longer than the alternate mode non-interlaced scan time), the first display system is synchronized with the second display system as follows:

a. If the first display system falls behind the second display system (i.e. the VBI of the first display system occurs later than that of the second display system), the first display system is switched to the alternate display mode (i.e. the shorter scan time mode) and the second display system is maintained in the normal display mode.

b. If the first display system gets ahead of the second display system (i.e. the VBI of the first display system occurs sooner than that of the second display system), the first display system is maintained in the normal display mode and the second display system is switched to the alternate display mode (i.e. the shorter scan time mode).

The following table (Table 1) summarizes the actions taken for synchronizing devices in each of the four different configurations. It will be apparent to those of ordinary skill in the art that other configurations are possible; yet, the present invention still performs synchronization as appropriate for the particular configuration.

TABLE 1

|  | Case 1 | Case 2 | Case 3 | Case 4 |
| --- | --- | --- | --- | --- |
| Normal Display Mode | Non-Interlaced | Interlaced | Non-Interlaced | Interlaced |
| Alternate Display Mode | Interlaced | Non-Interlaced | Interlaced | Non-Interlaced |
| Non-Interlaced Lines/Frame | 263 | 263 | 262 | 262 |
| Action if subject display system falls behind other display system | Switch subject display system to alternate mode. Maintain other display system in normal mode. | Maintain subject display system in normal mode. Switch other display system to alternate mode. | Maintain subject display system in normal mode. Switch other display system to alternate mode. | Switch subject display system to alternate mode. Maintain other display system in normal mode. |
| Action if subject display system gets ahead of other display system | Maintain subject display system in normal mode. Switch other display system to alternate mode. | Switch subject display system to alternate mode. Maintain other display system in normal mode. | Switch subject display system to alternate mode. Maintain other display system in normal mode. | Maintain subject display system in normal mode. Switch other display system to alternate mode. |

It is normally the case that between any two similar crystal controlled systems, one system is always slightly faster than the other and therefore one system is always making the timing adjustments. It does however, occur that one system may initially be faster, yet over time, the other system may overtake the initially faster system. Some environmental conditions such as temperature can cause this effect. For example, one system may have been powered up for a while and the other system was just turned on and eventually warms up. Thus, a well-designed system must be prepared to have either display device adjust to the other. There can be no reliance on the fact that one system may always be the faster system.

It may be desirable in an alternative display system to always remain in interlaced or non-interlaced mode. In such cases, it is possible to adjust the synchronization of two display systems by switching a display system between two field or frame sizes. Thus, for example, in a system remaining in a non-interlaced mode, the timing adjustment apparatus switches between a first frame size of 262 scan lines and a second frame size of 263 lines. In a system remaining in an interlaced mode, the timing adjustment apparatus switches between a first field size of 262.5 scan lines and a second field size of 263.5 or 261.5 scan lines.

It may be desirable in another alternative display system to obtain a more subtle or more finely selectable timing adjustment. In this case, the horizontal line timing can be used to adjust the synchronization between two raster display systems. For example, NTSC has better chroma performance for a fixed number of color burst clocks per horizontal line time, so a natural time constant to vary is color burst clocks/scan line. By increasing or decreasing the horizontal line time by one color burst clock (1/3.579545 MHz) for all scan lines in two fields or one frame, the overall display timing can be altered to a lesser degree than possible by increasing or decreasing the number of scan lines scanned for a field or frame.

PAL and SECAM standard display systems can be controlled using the same interlaced/non-interlaced timing adjustment described above for an NTSC system. The PAL and SECAM standard display systems are based on a 50 Hz field (or non-interlaced frame) rate, with 312.5 lines per field and either 312 or 313 lines per non-interlaced frame. PAL and SECAM standard display systems can be synchronized by switching between an interlaced or non-interlaced mode in the manner described above.

Figure 5:
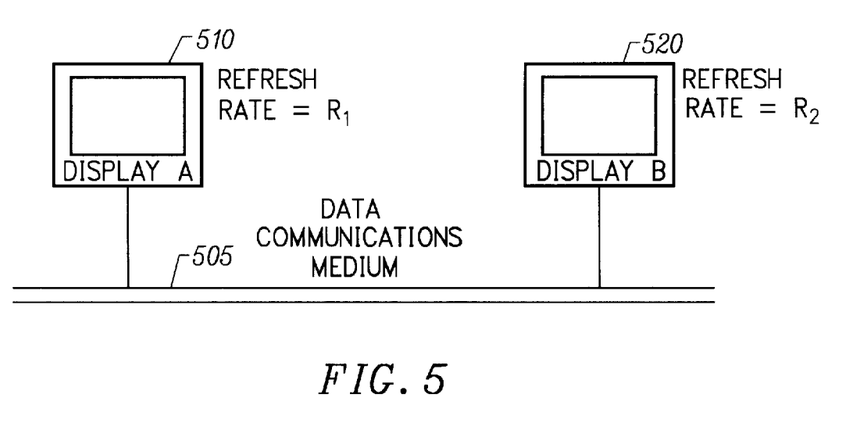
FIG. 5 illustrates a typical system having a plurality of raster display devices coupled to a data communication medium.

Referring now to FIG. 5, a typical system architecture in which the present invention is used is illustrated. A data communication medium 505 provides a means for transferring information between a first raster display device 510 and a second raster display device 520. In some situations, it is necessary to synchronize device 510 with device 520 on a frame by frame basis; however, separate timing or synchronization signals between the two devices are not available. The present invention provides a means and method for synchronizing these two devices as is described herein.

Referring again to FIG. 5, data communication medium 505 may be any conventional data communication medium including a conventional local area network (LAN), a conventional wide area network (WAN), a conventional telephone line and modem communication medium, a radio-frequency communication medium, a broadband cable television communication medium, a simple serial or parallel cable (i.e. a direct connect data communications cable), or any other well known data communication medium. Raster display 510 and raster display 520 are both conventional raster scan display devices each including an interlaced and non-interlaced mode of operation as described earlier. Raster display 510 operates at a refresh rate of $R_1$. Raster display 520 operates at a refresh rate of $R_2$. Even though raster display 510 and raster display 520 are comprised of identical hardware with the same number of scan lines and configured to operate at the same refresh rate, subtle variations in the oscillators or timing circuits of displays 510 and 520 and other factors such as environmental factors contribute to cause refresh rate $R_1$ to be slightly different from refresh rate $R_2$. Thus, even if display 510 and display 520 both begin displaying identical image frames at the same instant, eventually display 510 will be displaying a different video frame than display 520 because of the variations in refresh rate in $R_1$ and $R_2$. Thus, some form of synchronization is required to make sure that display 510 and display 520 always display the same video frame.

Most computer based display controllers do not accept external synchronization clocks. If such clocks are provided, they are required to be accurate to a fraction of a pixel. For NTSC, PAL, or SECAM standard systems, this represents an accuracy of less than 100 usec. A typical voice-grade telephone modem (such as one based on the V.22 bis standard) recovers its data clock with far less accuracy than one microsecond; thus, such a highly accurate clock is not available in these applications. Many communication channels 505 are far too imprecise in their timing to provide such accurate clocks. Thus, it is impractical in most cases to a) input a synchronizing clock to the display controller of devices 510 and 520, and b) if an input (such as genlock) is available, its accuracy requirements often exceed the timing accuracy of the available communication medium.

The present invention provides a means and a method for synchronizing the display of images between two different raster display systems such as display 510 and display 520 without requiring a precise clock between them. The present invention uses the timing variation between interlaced mode and non-interlaced mode for correcting any timing differences between the two display systems.

Figure 4:
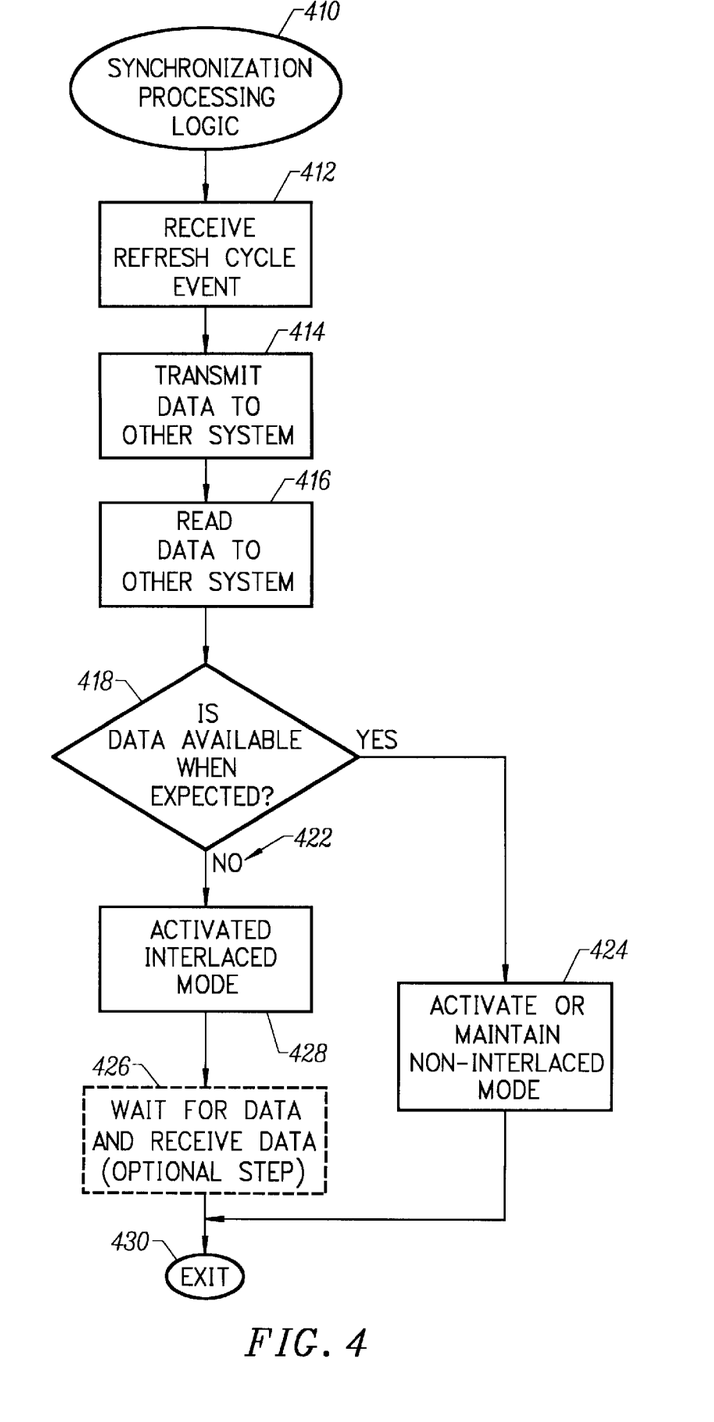
FIG. 4 is a flowchart illustrating the processing logic of the present invention.

Referring now to FIG. 4, a flow chart illustrates the processing steps performed by the present invention. The synchronization processing logic of the present invention may be implemented as software or as a hardware/software implementation or purely in hardware. Various methods for implementing the processing logic illustrated in FIG. 4 will be apparent to those of ordinary skill in the art. The synchronization processing logic of the present invention for a subject display system begins at bubble 410 illustrated in FIG. 4. Each display system, such as display systems 510 and 520, executes its own implementation of synchronization processing logic 410. In this example, it is assumed that the normal display mode for both display systems is 262 lines of half-resolution non-interlace (as is usually the case with Sega Genesis video games, for example), and the alternate display mode is field-doubled interlace of 262.5 lines per field.

When the subject display system has completed scanning the display screen for a particular refresh cycle, a vertical blanking interrupt (VBI) or other refresh cycle event is generated by the display system and received by the synchronization processing logic in processing block 412. The subject display system then formulates a message indicating a refresh cycle has been completed. This message is transmitted to another display system across data communication medium 505 in processing block 414. Concurrently, the other display system on the data communication medium 505 is performing the same synchronization processing steps and sending messages to the subject display system on the data communication medium 505. After transmitting its refresh complete message on the data communication medium, the subject display system attempts to read a refresh complete message from the other display system in processing block 416. If the data is available from the other display system at the time the subject display system attempts to read the refresh complete message or available by some expected time relative to the activation of VBI, processing path 420 is taken to processing block 424. In this cases the subject display system has not fallen out of synchronization with the other display system with which synchronization is desired. At processing block 424, the non-interlaced mode, which is the normal mode of operation in the present example, is activated or maintained as current. Synchronization processing logic then exits through bubble 430.

If the subject display system attempts to read a refresh cycle complete message from the other display system and the message is not available or not received within a predetermined time period, processing path 422 is taken to processing block 428. In this case, the subject display system has gotten slightly ahead of the other display system. Because the subject display system has gotten slightly ahead, the current refresh cycle for the other display system was completed later than expected as compared to the subject display system. In this case, the interlaced mode is activated in processing block 428. The activation of interlaced mode lengthens the refresh cycle time required for the subject display system for each of the next two fields by At as described earlier in connection with FIGS. 3A and 3B (i.e., the subject display goes from 262 lines to 262.5 lines in interlaced mode). By activating interlaced mode in processing block 428 and thereby lengthening the next refresh cycle time, the next VBI for the subject display system occurs later than it would have if the subject display system had remained in a non-interlaced mode. By completing the next refresh cycle later, the subject display system allows the other display system to catch up. In other words, if the synchronization message from the other display system is late, as is the case when the subject display system has gotten slightly ahead of the other system, the synchronization message will be closer to being available when expected for the next frame if the synchronization message for the next frame is read half of a scan line later. As long as the synchronization message from the other display system is unavailable when expected, the subject display system is maintained in interlaced mode thereby lengthening each subsequent refresh cycle until synchronization is achieved, and the synchronization message is received when expected. Note that due to the inherent precision required for NTSC (for example, for color generation), we are guaranteed that the two systems will not drift out of synchronization very quickly relative to each other, and as such, the one half line adjustment will only be necessary (at worst) every several hundred frames. Note also that optional processing block 426 could be implemented to wait for the late data if that data content is of value. In the preferred embodiment, the data content is not important for synchronization purposes (but it is used to transfer other information relevant to application software running on the video game system). Rather, only the time at which the data is received is important to remain synchronized. Because drift out of synchronization is known to be slow, the wait for the late data will not be long.

Figure 6:
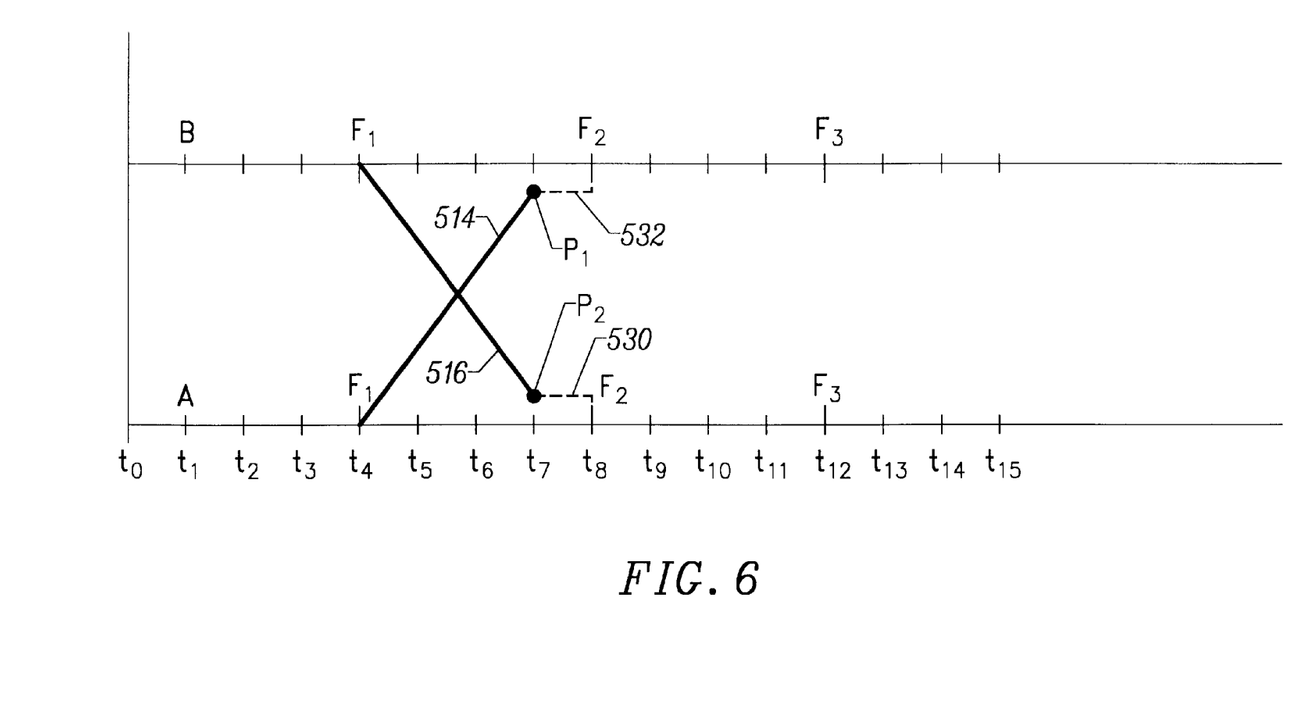
FIG. 6 illustrates the operation of the present invention when the display systems are synchronized.

Referring now to FIG. 6, a pair of time lines corresponding to a display system A and a display system B is illustrated. Each of display systems A and B display a set of frames F1 to F3. The completion of the refresh cycle for each of these frames is shown as points F1, F2, and F3 in FIG. 6. On receiving the VBI at the completion of frame F1 at time $t_4$, display system A transmits data to display system B and sets up to read data from display system B as indicated by line 514. Similarly, display system B transmits data to display system A and sets up to read data from display system A as indicated by line 516. At time $t_7$, data is available from display system A as indicated by point P1. The difference between time $t_4$ and time $t_7$ reflects communication channel latency. When display system B is ready to read this data at the completion of frame F2, this data will still be available and held in a buffer, as indicated by dashed line 532. Similarly, the data from display system B is available at point P2. Again, the difference between time $t_4$ and time $t_7$ reflects communication channel latency. This data is read by display system A at the completion of frame F2. This data will still be available for display system A as indicated by dashed line 530. Thus, according to the timing example illustrated in FIG. 6, display system A and display system B are both in synchronization and maintained in a non-interlaced mode.

Figure 7:
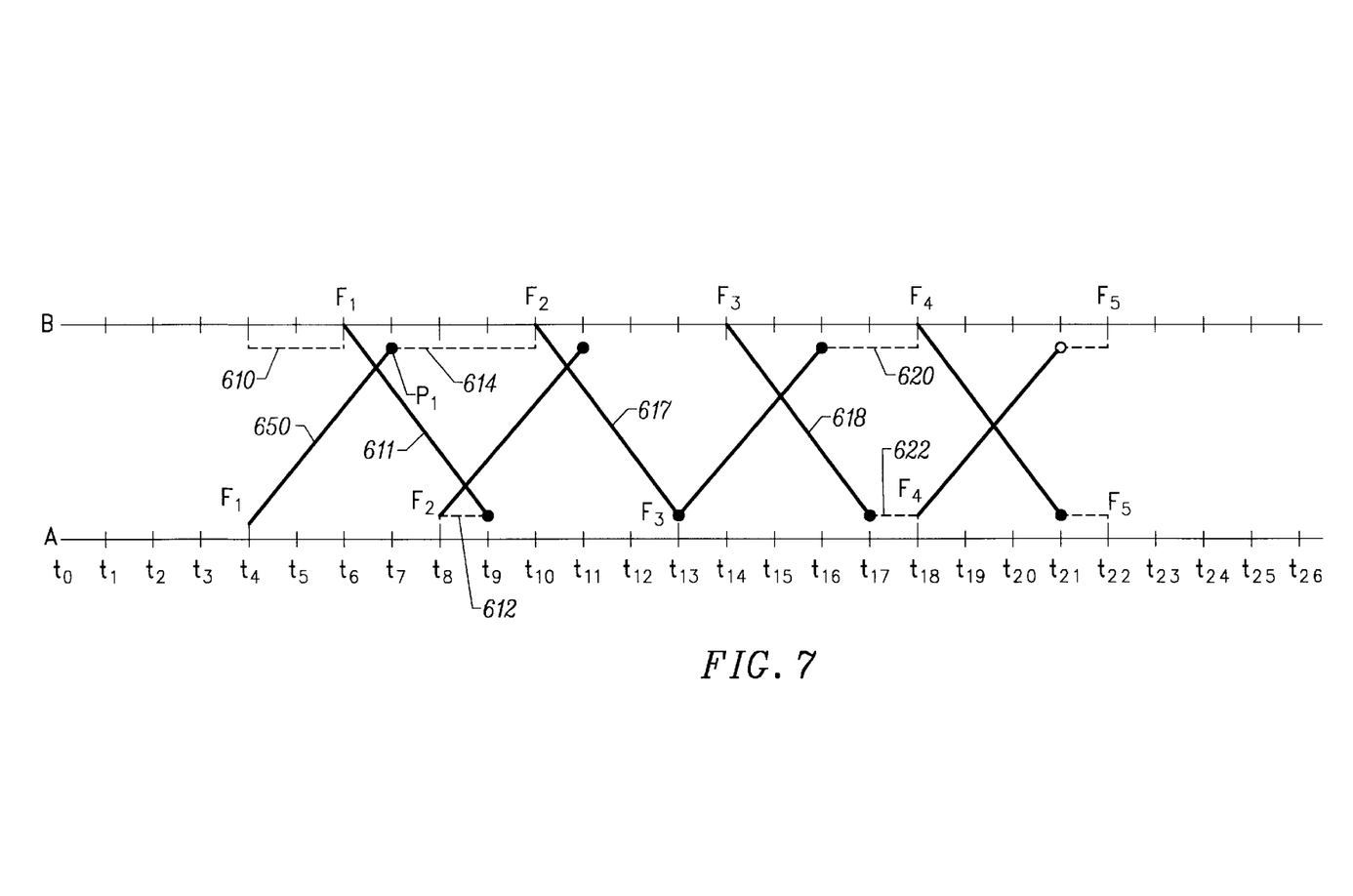
FIG. 7 illustrates the operation of the present invention when the display systems have drifted out of synchronization and a timing correction is required.

Referring now to FIG. 7, an example shows the timing correction performed by the present invention when the timing between display system A and display system B begins to drift apart. As in the previous example, we assume for this example that the normal display mode is non-interlace, the alternate display mode is interlace, and non-interlace mode produces a shorter frame time than interlace mode. In this example, the display of frame F1 as displayed by display system A and display system B has drifted apart in time by the quantity illustrated by dashed line 610 illustrated in FIG. 7. Note that the timing adjustments induced by switching to interlace mode are grossly exaggerated in this illustration so as to highlight the operation of the present invention.

Display system A receives the VBI for frame F1 at time $t_4$. Display system A then transmits data to display system B as indicated by line 650 illustrated in FIG. 7. Display system B receives the VBI for frame F1 at time $t_6$. The difference between time $t_6$ and time $t_4$ represents the skew or the amount of time that display system A and display system B have drifted out of synchronization. At time $t_6$, display system B transmits data to display system A as indicated by line 611. At time $t_8$, display system A receives a VBI for frame F2. Display system A expects to have received data from system B by this time; however, because of the skew between the display systems, the data indicated by line 611 has not yet arrived for display system A at time $t_8$. Thus, display system A switches to interlace mode, thereby lengthening the frame time as shown by the exaggerated delayed arrival of frame F3 at time $t_{13}$. If display system A had remained in non-interlaced mode, the VBI for frame F3 would have occurred at time $t_{12}$. The exaggerated delayed start of frame F3 is represented as the difference between time $t_{13}$ and time $t_{12}$. For display system B, however, the VBI for frame F2 occurs at time $t_{10}$. Display system B expects to have received data from display system A by this time. Indeed, the data from display system A is available for display system B and held in a buffer, as indicated by line 650 and dashed line 614. In this example, the data from display system A was available at time $t_7$. Because display system B receives the data from display system A as expected, display system B remains in a non-interlaced mode thereby maintaining its frame length in a normal size. Thus, subsequent frames for display system B occur at normal intervals and also at shorter intervals relative to display system A while display system A remains in an interlaced mode. As can be seen in FIG. 7, this results in data sent from display system B to almost arrive in time for VBI (line 617 shows data arriving just before F3 starts), and finally arriving in time for VBI (line 618). So, in frame F4, display system A is switched to normal mode since the data from system B arrived on time, and both systems remain in normal mode until they again drift out of synchronization and data from one arrives too late for VBI of the other.

The example of the preferred embodiment described above in connection with FIG. 7 illustrates the use of the VBI as the event (refresh cycle event) to which the expected arrival time of a synchronization message from another display system is referenced. Thus, in the preferred embodiment described above, if the VBI is received at time $t_0$, the expected arrival time of a synchronization message is set to time $t_0$. The VBI provides a convenient way of triggering the transmission of a synchronization message to another display system and for referencing the expected arrival time of a synchronization message from another display system.

As an alternative embodiment of the present invention, a refresh cycle event other than the VBI itself can be used to trigger the synchronization process. For example, a time offset can be applied to the VBI when the expected arrival time of a synchronization message from another display system is computed. In this alternative embodiment, if the VBI is received at time $t_0$, the expected arrival time of a synchronization message can be set to time $t_0 \pm t_{offset}$. In this manner, the expected arrival time of a synchronization message can be advanced or delayed from the VBI time. This allows for more precise synchronization. Accuracy is limited by the greater of: i) one scan line, or ii) the timing precision of the communication medium.

In another alternative embodiment, a refresh cycle event other than the VBI or an offset thereof can be used. For example, a refresh cycle event based on the number of scan lines scanned for a particular frame can serve as a trigger event for computing an expected time for receipt of a synchronization message. Using this alternative embodiment, a refresh cycle event can be defined as occurring when the current frame has been partly scanned. For example, a refresh cycle event can be generated when scanning of the current frame is 50% or 25% complete. This alternative embodiment is useful if the VBI is unuseable or inconvenient for use as a refresh cycle event. Also, many video game systems (such as the Sega Genesis system) can generate interrupts on particular scan lines. These interrupts can also be used as a refresh cycle event.

Note that in all cases, the expected arrival time can be advanced or delayed by more than one frame time. Thus, the latency in the receipt of the synchronization message can be several frame times without loss of synchronization using the present invention.

It may be desirable to accommodate imprecise timing references for determining whether displays are "ahead or behind" relative to each other. This can be easily accomplished by specifying a threshold for switching to alternate mode which is larger than the worst case jitter of the timing reference. Thus, even with an imprecise timing reference, both displays will usually remain in normal mode.

The oscillators in crystal controlled display systems provide a reasonably accurate timing source. Two or more systems operating with different oscillators will certainly drift out of synchronization eventually; however, the rate of drift will typically be rather small/slow. For this reason, intermittent short interruptions in the operation of the communication medium between display systems being synchronized using the present invention can be tolerated. In addition, loss of the refresh cycle event timing reference for short duration can also be tolerated by the present invention. In both of these situations, the synchronization process described above is continued once the operation of the communication medium or the timing reference is re-established. Interruptions of up to two seconds can usually be tolerated in most situations.

The present invention can also be used in a communications environment with asymmetric latency. The present invention is affected only by the latency in each direction of information transfer independently. So long as the latency each way is consistent, the measurement of the data arrival time in each direction will provide a sufficient time reference for each respective display system. The refresh cycle events of the two display systems may settle into relative positions where they are skewed from one another; but, they will remain locked together without one ever getting a frame ahead of the other.

The present invention can also tolerate periodically varying latency. If a communications channel is known to have gradually varying latency (e.g. if a data path is periodically re-routed due to traffic) and there is a means to detect that the latency has changed, the present invention can switch its timing measurement to a different arrival time (as an example) to accommodate the new latency. Even if there is a brief loss of timing reference while the latency is changing, the crystal controlled timing on the display generators will keep the two display systems in synchronization with each other.

The present invention can also be used in a single raster display as an apparatus for adjusting the timing of the raster display. It is sometimes necessary to synchronize the refresh timing of a raster display with a secondary timing event, rather than with another raster display. Such secondary timing events may originate from within the raster display itself or they may be external timing sources. Such secondary timing sources can include a timing source derived from a 60 Hz power line on a common power grid, a periodic satellite pulse, a broadcast timing signal, an alternate timing source within a computer system, or another secondary timing source. In the same manner described above for the synchronization of a first raster display with a second raster display, a single raster display can also be synchronized with the secondary timing source. Specifically, the present invention includes a means for detecting a refresh cycle event in the raster display, just like in the multiple raster display synchronization implementation. In addition, the present invention includes a means for detecting the secondary timing event comprising a signal path or an interface for receiving a secondary timing signal. The time of occurrence of the refresh cycle event is compared with the time of occurrence of the secondary timing event. If the refresh cycle of the raster display drifts out of synchronization with the secondary timing event, the present invention activates an alternate display mode in the raster display to re-establish synchronization of the raster display refresh cycle with the secondary timing source. In a manner similar to the method and apparatus described above for applying a timing offset to the expected message arrival time calculation, a timing offset can also be applied to the secondary timing event prior to being compared with the refresh cycle event. This provides better control over the synchronization process.

In an alternative embodiment of the apparatus and method for adjusting the refresh timing in a single raster display, the secondary timing event can also be received by the raster display via a data communications medium, such as a network or a direct connect cable. Secondary timing information is coded into a message received and interpreted by the present invention in the raster display. The present invention then compares the secondary timing information thus received with the refresh cycle timing of the raster display and activates an alternative display mode to synchronize the two timing sources.

In yet another alternative embodiment of the apparatus and method for adjusting the refresh timing in a single raster display, the refresh timing of the raster display is averaged over multiple cycles. After the average refresh cycle timing is determined, the average can be adjusted by periodically switching the raster display to an alternate display mode. One example of an application for such an averaging technique is for synchronizing a raster display with a sound generator in a multimedia capable computer system. In such multimedia systems, it is necessary to synchronize the timing of the raster display with the timing of the sound generator clock so that the video and audio presentations will be aligned. If the timing differential between the audio and video presentations is known, the raster timing, on average, can be adjusted using the present invention by periodically switching the raster display to an alternate display mode. In this manner, the average refresh cycle time for the raster device can be shortened or lengthened to conform with the audio timing.

In the preferred embodiment of the present invention for synchronizing two or more raster display systems, the content of the synchronization data transferred between systems is not important for synchronization purposes. Rather, only the time at which the data is received is important for synchronization. However, in an alternative embodiment of the present invention, the content of the synchronization data transferred between systems can be used to assist the synchronization process. In this embodiment, the synchronization data itself contains information defining the timing relationship between the refresh cycle event and a secondary timing reference. For example, the timing relationship information can include data defining the skew between the VBI of the raster display system and a secondary timing source. As set forth above, the secondary timing sources can include a timing source derived from a 60 Hz power line on a common power grid, a periodic satellite pulse, a broadcast timing signal, an alternate timing source within a computer system, or another secondary timing source. The timing relationship information is encoded into a synchronization message by a first raster display and sent to a second raster display across a data communications medium. The second raster display decodes the synchronization message and adjusts its own refresh cycle timing accordingly, if necessary, by entering an alternate display mode. Note that in this embodiment, the arrival time of the synchronization message is irrelevant to the synchronization process.

In yet another embodiment of the present invention, the synchronization process described herein can be used to synchronize multiple raster displays arranged in a daisy chain configuration. In this embodiment, it is desired to have all raster display systems synchronized together. However, it is undesirable to require all raster displays to communicate with all other raster displays for the purpose of synchronization. The present invention allows each raster display system to communicate with one and only one other raster display for the purpose of synchronization. If each raster display in the daisy chain has the capability to slow its refresh cycle by entering an alternate display mode, a raster display that begins to get ahead of the one other raster display with which it is communicating switches to the alternate display mode to regain synchronization with the slower raster display. The other raster displays in the daisy chain will correspondingly slow down by using their alternate display modes. Eventually, each raster display in the daisy chain will be synchronized with the slowest raster display of the group. If each raster display in the daisy chain has the capability to speed up its refresh cycle by entering an alternate display mode, a raster display that begins to get behind one of the other raster displays with which it is communicating switches to the alternate display mode to regain synchronization with the faster raster display. The other raster displays in the daisy chain will correspondingly speed up by using their alternate display modes. Eventually, each raster display in the daisy chain will be synchronized with the fastest raster display of the group.

Thus, an apparatus and method for synchronizing closed free-running systems is disclosed. These specific arrangements and methods described herein are merely illustrative of the principles of this invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

We claim:

1. An apparatus for adjusting the timing of the display of frames in a first raster display having an interlaced display mode and a non-interlaced display mode, said apparatus comprising:

processing logic that detects a refresh cycle event in the first raster display operating in one of said interlaced display mode and said non-interlaced display mode;

processing logic that receives information indicative of a secondary timing event, said information being received from an external timing reference;

processing logic that compares a time of occurrence of said refresh cycle event with said information indicative of said secondary timing event;

processing logic that activates an alternate one of said interlaced display mode and said non-interlaced display mode in said first raster display to synchronize the display of frames in said first raster display in reference to said secondary timing event; and the external timing reference based on a refresh cycle event in a second raster disply having interlaced display mode and not said non-interlaced display mode.

2. An apparatus for adjusting the timing of the display of frames in a raster display having an interlaced display mode and a non-interlaced display mode, said apparatus comprising:

processing logic that detects a refresh cycle event in the first raster display operating in one of said interlaced display mode and said non-interlaced display mode;

processing logic that receives information indicative of a secondary timing event, said information being received from an external timing reference;

processing logic that compares a time of occurrence of said refresh cycle event with said information indicative of said secondary timing event;

processing logic that activates an alternate one of said interlaced display mode and said non-interlaced display mode in said first raster display to synchronize the display of frames in said first raster display in reference to said secondary timing event; and the external timing reference based on a refresh cycle event in a second raster display having said non-interlaced display mode and not said interlace display mode.

3. An apparatus for adjusting the timing of the display of frames in a first raster display having an interlaced display mode and a non-interlaced display mode, said apparatus comprising:

processing logic that detects a refresh cycle event in the first raster display operating in one of said interlaced display mode and said non-interlaced display mode;

processing logic that receives information indicative of a secondary timing event, said information being received from an external timing reference;

processing logic that compares a time of occurrence of said refresh cycle event with said information indicative of said secondary timing event;

processing logic that activates an alternate one of said interlaced display mode and said non-interlaced display mode in said first raster display to synchronize the display of frames in said first raster display in reference to said secondary timing event; and the external timing reference based on a refresh cycle event in a second raster display having said interlaced display mode and said non-interlaced display mode.

* * * * *